(12) United States Patent
Bransberg et al.

(10) Patent No.: US 10,478,909 B2
(45) Date of Patent: Nov. 19, 2019

(54) MACHINE FOR MACHINING WORKPIECES

(71) Applicant: GLEASON SWITZERLAND AG, Studen (CH)

(72) Inventors: Frederik Bransberg, Zurich (CH); Urs Bernhardsgruetter, Russikon (CH)

(73) Assignee: GLEASON SWITZERLAND AG, Studen (CH)

( * ) Notice: Subject to any disclaimer, the term of this patent is extended or adjusted under 35 U.S.C. 154(b) by 68 days.

(21) Appl. No.: 14/911,585

(22) PCT Filed: Nov. 1, 2013

(86) PCT No.: PCT/CH2013/000190
§ 371 (c)(1),
(2) Date: Feb. 11, 2016

(87) PCT Pub. No.: WO2015/021565
PCT Pub. Date: Feb. 19, 2015

(65) Prior Publication Data
US 2016/0184910 A1 Jun. 30, 2016

(30) Foreign Application Priority Data

Aug. 12, 2013 (CH) ...................................... 1379/13

(51) Int. Cl.
*B23F 19/05* (2006.01)
*B23F 23/12* (2006.01)
(52) U.S. Cl.
CPC ........ *B23F 19/057* (2013.01); *B23F 23/1231* (2013.01)
(58) Field of Classification Search
CPC ........ B23F 19/05; B23F 19/057; B23F 23/12; B23F 23/1231
(Continued)

(56) References Cited

U.S. PATENT DOCUMENTS 5,347,760 A * 9/1994 Miyauch ............... B23F 19/057
451/114
6,497,610 B1 * 12/2002 Reichert ............. B23F 23/1231
451/21
2012/0225614 A1 9/2012 Ochi et al.

FOREIGN PATENT DOCUMENTS

DE 2719524 A1 12/1977
DE 9300936.4 U1 5/1993
(Continued)

*Primary Examiner* — Robert A Rose
(74) *Attorney, Agent, or Firm* — Birch, Stewart, Kolasch & Birch, LLP (57) ABSTRACT

A machine for machining workpieces includes a machine frame (110, 120), a honing ring carrier (60) which is mounted on the machine frame and in which a honing ring or a honing ring blank is clampable and rotationally drivable about its central axis, and a workpiece spindle module (50) having a workpiece spindle (54), wherein a workpiece which is to be machined with the honing ring clamped in the honing ring carrier (60) is mountable in the region of a free end of the workpiece spindle (54). The machine further includes a grinding module (130) for profiling a honing ring as a result of grinding a honing ring blank, wherein the grinding module (130) is arranged in such a manner on the machine frame (110, 120) that a grinding wheel of the grinding module (130) can be positioned relative to the honing ring carrier (60) inside a truly three-dimensional space. The profiling of a honing ring and the honing of a workpiece can consequently be effected in the same clamping setup of the honing ring. Problems, which are produced as a result of inaccurate centering when (re-)clamping the honing ring, are avoided as a result. An externally profiled tool which is specific to honing rings, e.g. a diamond gear wheel, is not required to produce the honing ring.

13 Claims, 6 Drawing Sheets

(58) Field of Classification Search
 USPC .............................................. 451/47, 72, 56
 See application file for complete search history.

(56) References Cited

FOREIGN PATENT DOCUMENTS

| | | |
|---|---|---|
| DE | 2 270 273 A | 3/1994 |
| DE | 4329822 C2 | 9/1996 |
| DE | 102005005993 A1 | 8/2006 |
| DE | 202011051332 U1 | 11/2011 |
| DE | 102010024366 A1 | 12/2011 |
| EP | 1319458 B1 | 11/2010 |
| JP | 52-140097 A | 11/1977 |
| JP | H06-79526 A | 3/1994 |
| JP | 6-143031 A | 5/1994 |
| JP | 6-190631 A | 7/1994 |
| JP | 7-237036 A | 9/1995 |
| JP | 2001-088027 A | 4/2001 |
| JP | 2006-326825 A | 12/2006 |

* cited by examiner

MACHINE FOR MACHINING WORKPIECES

TECHNICAL SCOPE

The invention relates to a machine for machining workpieces, namely for producing a honing ring and for honing workpieces. The invention further relates to a method for gear wheel honing.

PRIOR ART

Machines and methods for gear wheel honing are known. When externally toothed gear wheels are produced, after the basic profiling of the workpiece, a honing ring rolls with the workpiece to be machined with the axes offset. When honing internally toothed gear wheels, an abrasive gear wheel with external toothing is used in an analogous manner to this. These types of honing machines are used, among other things, for the mass production of gear wheels for drive components of vehicles such as, for example, passenger vehicles and trucks. Compared to ground gear wheels, honed gear wheels are distinguished by their advantageous noise characteristics and low level of wear. Deep cutting speeds are used in the case of honing, as a result of which the thermal stress on the workpiece can be kept small.

The production of the honing ring or of the honing gear wheel is demanding. To this end, a blank is conventionally pressed from a pulverulent mixture of cutting material, binding material and auxiliary materials and hardened in a furnace. The toothing can also already be realized during the pressing operation. The flanks of the blank are then profiled with specially produced diamond gear wheels. Different machines are used for producing the honing ring and for the subsequent honing process, resulting in a large floor area being necessary and high investment costs occurring.

EP 1 319 458 B1 (The Gleason Works) relates to a method for manufacturing an internally toothed honing ring on a honing machine having a tool spindle and workpiece spindle, the axes of which intersect and which are drivable by way of their own drives. To this end, a non-toothed honing ring blank is clamped onto the tool spindle and moved into contact with an externally toothed tool that is clamped on the workpiece spindle, driven synchronously with the rotation of the tool and at the same time set in a radial manner. The externally toothed tool is a gear wheel coated with a hard material, in particular diamond.

Consequently, the honing ring can be produced and then honed on the same machine. However, producing the externally toothed tool for producing the honing ring is costly, the diamond gear wheel is correspondingly expensive. A new corresponding profiling tool is necessary for each honing ring geometry. This is significant in particular where smaller batches of gear wheels are to be produced. In addition, a further machine is required, in turn, to produce the externally toothed tool.

REPRESENTATION OF THE INVENTION

It is the object of the invention to create a machine for machining workpieces pertaining to the technical field initially mentioned as well as a method for honing gear wheels, both of which enable increased flexibility with reduced costs.

The solution to the object is defined by the features of claim 1. According to the invention, the machine for machining workpieces includes a) a machine frame;
b) a honing ring carrier which is mounted on the machine frame and in which a honing ring or a honing ring blank is clampable and rotationally drivable about its central axis;
c) a workpiece spindle module having a workpiece spindle, wherein a workpiece which is to be machined with the honing ring clamped in the honing ring carrier is mountable in the region of a free end of the workpiece spindle;
d) a grinding module for profiling a honing ring as a result of grinding a honing ring blank, wherein the grinding module is arranged in such a manner on the machine frame that a grinding wheel of the grinding module can be positioned relative to the honing ring carrier inside a truly three-dimensional space.

Both the production (profiling) of the honing ring, that is to say generating the toothing, and the honing can consequently be carried out using the machine according to the invention. Between the production of the honing ring and its use in the honing process, it does not have to be removed from the honing ring carrier. The producing (profiling) of the honing ring and the honing process are consequently effected in the same clamping setup of the honing ring. As a result, problems which are caused by incorrect centering when (re-)clamping the honing ring are avoided right from the start. An externally toothed tool (diamond gear wheel) that is specific to the honing ring is not required for producing the honing ring. The profiling of the honing ring is effected by means of the grinding module. It is possible to produce honing rings of different geometry using the same grinding module.

The relative positionability of the grinding wheel with reference to the honing ring carrier inside a truly three-dimensional space can be realized in different ways. Thus, for example, the grinding wheel can be realized so as to be movable along three Cartesian axes, or one or several of said axes are degrees of freedom of the honing ring carrier. In addition, one or several of the axes can also be realized as swivel axes, among other things.

In particular, using the machine according to the invention, but also with other devices, it is possible to carry out a method according to the invention for honing gear wheels which includes the following steps:

a) mount a honing ring blank in a honing ring carrier of a machine;
b) produce a honing ring as a result of grinding the honing ring blank with a grinding module of the machine;
c) put the grinding module into an idle position and position a workpiece spindle module of the machine in an operating position;
d) mount a gear wheel blank to be honed on a workpiece spindle of the workpiece spindle module; and
e) produce a gear wheel as a result of honing the gear wheel blank by means of the honing ring.

The production of the honing ring as a result of grinding and the production of the gear wheel as a result of honing can consequently be effected with the honing ring in the same clamping setup.

The grinding and workpiece spindle module can be mounted on the machine at the same time and in each case can be moved into the operating position or into the idle position as a result of a change in position. However, it is also possible to exchange the modules for one another for this purpose.

Advantageously, the machine includes a dressing unit that is arranged on the machine frame for dressing the grinding wheel of the grinding module, wherein the grinding module is movable between a dressing position and a grinding position as a result of positioning the module carrier. Thus, within the framework of the method, prior to or during the production of the honing ring, a dressable grinding wheel of the grinding module can be dressed using a dressing unit which is arranged on the machine. The grinding wheel consequently remains in the grinding module during the entire process such that the entire process of profiling the gear wheel blank and of the subsequent honing is able to run in a fully automatic manner. The grinding wheel is also additionally able to be used within the framework of the honing process for re-profiling the honing ring, i.e. for sharpening and for small corrections in form. For example, re-profiling is effected in each case after a certain number of honed workpieces.

During the profiling of the honing ring, that is to say when the toothing is being generated, the grinding wheel can be repeatedly re-dressed depending on the requirement. In this case, the same geometry and surface quality can always be generated again. However, it can be advantageous when different surface qualities are used within a profiling operation, e.g. a rough surface for rough machining and a finer surface for finishing. Even the geometry can be chosen to be (slightly) different, e.g. the geometry of the toothing is generated coarsely first of all as a result of rough machining, whilst subsequently, as a result of finishing, only the actual operating contours are machined again.

In an alternative embodiment, the dressing unit is arranged on a mobile element of the machine such that the dressing unit can be moved relative to the grinding module into a dressing position. Within said framework, it is preferred when the dressing unit is arranged on the honing ring carrier and said honing ring carrier enables a corresponding movement, e.g. along a horizontal linear axis. As an alternative to this, the dressing unit is arranged on the machine frame in a rigid manner or so as to be positionable by way of an auxiliary axis.

In a preferred manner, the sequence for dressing the grinding wheel and profiling the honing ring includes the following steps:
1. pre-profiling the grinding wheel (rough machining) by means of static and/or rotating tools of the dressing unit
2. precise shaping and sharpening (making easy cutting) of the grinding wheel (finishing) by means of rotating tools of the dressing unit
3. pre-profiling the honing ring blank by means of the grinding wheel
4. precise shaping and sharpening (making easy cutting) of the pre-profiled honing ring blank by means of the grinding wheel In the case of a preferred embodiment, a rotational axis of the workpiece spindle and a rotational axis of the grinding wheel are oriented perpendicularly with respect to one another. In the case of a substantially horizontally oriented honing ring, the rotational axis of the workpiece spindle is, for example, substantially vertical, whilst the rotational axis of the grinding wheel is oriented in a horizontal manner.

Said arrangement is especially suitable for profiling the honing ring, i.e. for generating the toothing in the honing ring blank.

In the case of one embodiment of the invention, the machine comprises a module carrier with at least one coupling for a machining module, wherein the module carrier is arranged in such a manner on the machine frame that the coupling can be positioned relative to the honing ring carrier inside a truly three-dimensional space, wherein the grinding module and the workpiece spindle module are couplable to the coupling of the module carrier.

The relative positionability of the coupling inside a truly three-dimensional space with reference to the honing ring carrier can be realized in different ways. Thus, for example, the coupling can be realized so as to be movable along three Cartesian axes, or one or several of said axes are degrees of freedom of the honing ring carrier. In addition, or one or several of the axes can also be realized as swivel axes, among other things.

In an advantageous manner, the at least one coupling for the machining module is provided with a rapid clamping system. Thus, the machining modules are able to be exchanged rapidly and simply.

As an alternative to this or in addition to it, the module carrier can comprise several couplings for machining modules, wherein the couplings are movable from an idle position into an operating position. Consequently, exchanging the machining modules is superfluous, and a fully automatic mode without manual interventions or external components is possible.

As an alternative to this, there is present a device which performs the tool change, or the modules are changed manually.

In a preferred embodiment, the workpiece spindle module and the grinding module are arranged independently of one another on the machine frame. Thus, the workpiece spindle module can be realized in a relatively rigid manner in order to be able to absorb the forces occurring during the honing process, whilst the grinding module is realized in a compact and flexible manner. The workpiece spindle module is mounted, for example, with the spindle directed vertically upward in a receiving chamber of the machine frame below the honing ring carrier, whilst the grinding module is arranged on the machine frame above the honing ring carrier, for example on a machine tower. The rotational axis of the grinding wheel of the grinding module is oriented, in this case, in a substantially horizontal manner.

In the case of a preferred embodiment, the machine frame surrounds the honing ring carrier and the honing ring carrier is mounted at two bearing points of the machine frame, which are located substantially diametrically opposite one another with reference to the honing ring carrier, so as to be movable linearly along a horizontal axis which extends through the bearing points and so as to be movable in rotation about said axis.

Said solution enables the machine according to the invention to be designed in a simple and compact manner. The machine frame serves not only as a structural element for supporting the individual components of the machine and all the necessary axes, but also at least in part for forming a working space in which the machining occurs.

For the honing of internal toothing, it is also possible to clamp the workpiece to be machined in the honing ring carrier and in turn the (externally profiled) honing tool (abrasive gear wheel) on the workpiece spindle.

The machine frame preferably forms a substantially closed casing which surrounds a working area. In particular, the casing is realized in such a manner that the escape of lubricants or chips is reliably prevented. At the same time, it prevents contact by persons which could result in injuries. As a result, further guards surrounding the honing ring carrier are extensively superfluous. The machine frame is, for example, closed at the bottom and at the lateral surface and comprises an opening which is only open to the working area at the top. The honing ring carrier and, where applicable, a workpiece spindle arranged below are accessible through said opening. The machine frame can comprise further (where applicable, closable) openings, e.g. for maintenance purposes.

In a preferred manner, the machine frame is realized in a straight cylindrical manner, in particular in a circular cylindrical manner. The shape of a straight cylinder allows for compact and at the same time sturdy geometry. Other shapes of the area of the straight cylinder, such as, for example, squares, rectangles, polygons with a higher number of corners or ellipses, are also possible.

In a preferred manner, the bearing points include plain bearings or hydrostatic bearings. As a result, the machine according to the invention can be realized in a cost-efficient and low-maintenance manner. The plain bearings also comprise a high level of rigidity and a high level of damping. Advantageously, the plain bearings are formed by plain bushings which are inserted into corresponding openings of the machine frame and provided with seals against soiling. Correspondingly dimensioned support elements, e.g. steel tubes, which extend on both sides of the honing ring carrier in the horizontal axis, consequently at the same time support the honing ring and also guide it along its linear movement axis, are able to interact, for example, with the plain bushings. The plain bearings preferably enable both said horizontal movement and the rotational movement of the honing ring carrier about the horizontal axis, therefore they serve as radial bearings with two degrees of freedom, one linear degree of freedom and one rotational degree of freedom.

In a particularly preferred manner, the support elements are mounted in such a manner on the honing ring carrier that, in their extension, they extend through the center point of the honing ring carrier. This allows for a particularly simple and sturdy structure.

As an alternative to this, roller bearings are used, for example, in place of plain bearings. The carriers can also be realized according to the geometry previously outlined when roller bearings are used. The rotational mobility can be realized independently of the bearing points of the machine frame, e.g. by the carriers comprising non-rotatable portions and portions that rotatable about the longitudinal axis of the carriers relative thereto.

A further possibility is the use of linear bushings. Thus, both directions of movement can be made available—as in the case of plain bearings—with the same bearing unit.

In the case of a preferred embodiment, the machine includes a carrier on which a first drive is arranged for a linear movement of the honing ring carrier along the horizontal axis which extends through the bearing points and a second drive is arranged for a rotational movement of the honing ring carrier about said axis. The carrier is arranged outside the machine frame and is displaceable together with the honing ring carrier along the horizontal axis. The corresponding support element for the honing carrier is advantageously fixed with the carrier in the axial direction, however is rotatable within a certain angular range in relation to the carrier about its longitudinal axis.

The drives arranged outside the machine frame are protected from influences of the machining operation and do not interfere with the workpiece spindle or the honing ring carrier. As a result of the entraining arrangement of the drives, force is transmitted in a simple manner to the axes to be actuated. Because the path of the carrier and consequently also of the entrained drives (e.g. servomotors) is small, the energy supply and control thereof can be effected in a simple manner by means of normal flexible conductors.

Advantageously, the first drive is coupled to a ball screw, the ball screw being supported on the machine frame. As a result, the support elements of the honing ring carrier are able to be adjusted in a simple and reliable linear manner. The first drive is connected to the ball screw for example by means of a gear unit, said ball screw can extend through a corresponding opening into the interior of the machine frame.

As an alternative to this, there is a different transmission, e.g. by means of a different type of spindle or a toothed rack, or a direct drive, such as a linear motor, is used.

In a preferred manner, a guide element is fixedly arranged in addition on the carrier, the guide element interacting with a further bearing point of the machine frame. Said guide element provides anti-rotation protection for the carrier such that the second drive for the rotational movement of the support element is able to be supported on the carrier in a simple manner.

Advantageously, the machine frame, at any rate the bottom part which surrounds the working area, is essentially produced from cast stone. A frame of this type is producible in a cost-efficient manner and forms as sturdy base for the machine according to the invention.

In further preferred embodiments, the machine frame is produced substantially from steel. Said choice of material enables the machine to be realized in a particularly compact manner. Steel tubes which are suitable for the casing of the machine frame can additionally be obtained on the market at a relatively low cost.

The machine frame can also be produced, for example, from granite or from a combination of the named materials.

Further advantageous embodiments and combinations of features of the invention come out from the detailed description below and the totality of the claims.

BRIEF DESCRIPTION OF THE DRAWINGS

The drawings used to explain the exemplary embodiment are as follows.

In principle, the same components are given the same reference symbols.

WAYS TO REALIZE THE INVENTION

Figure 1:
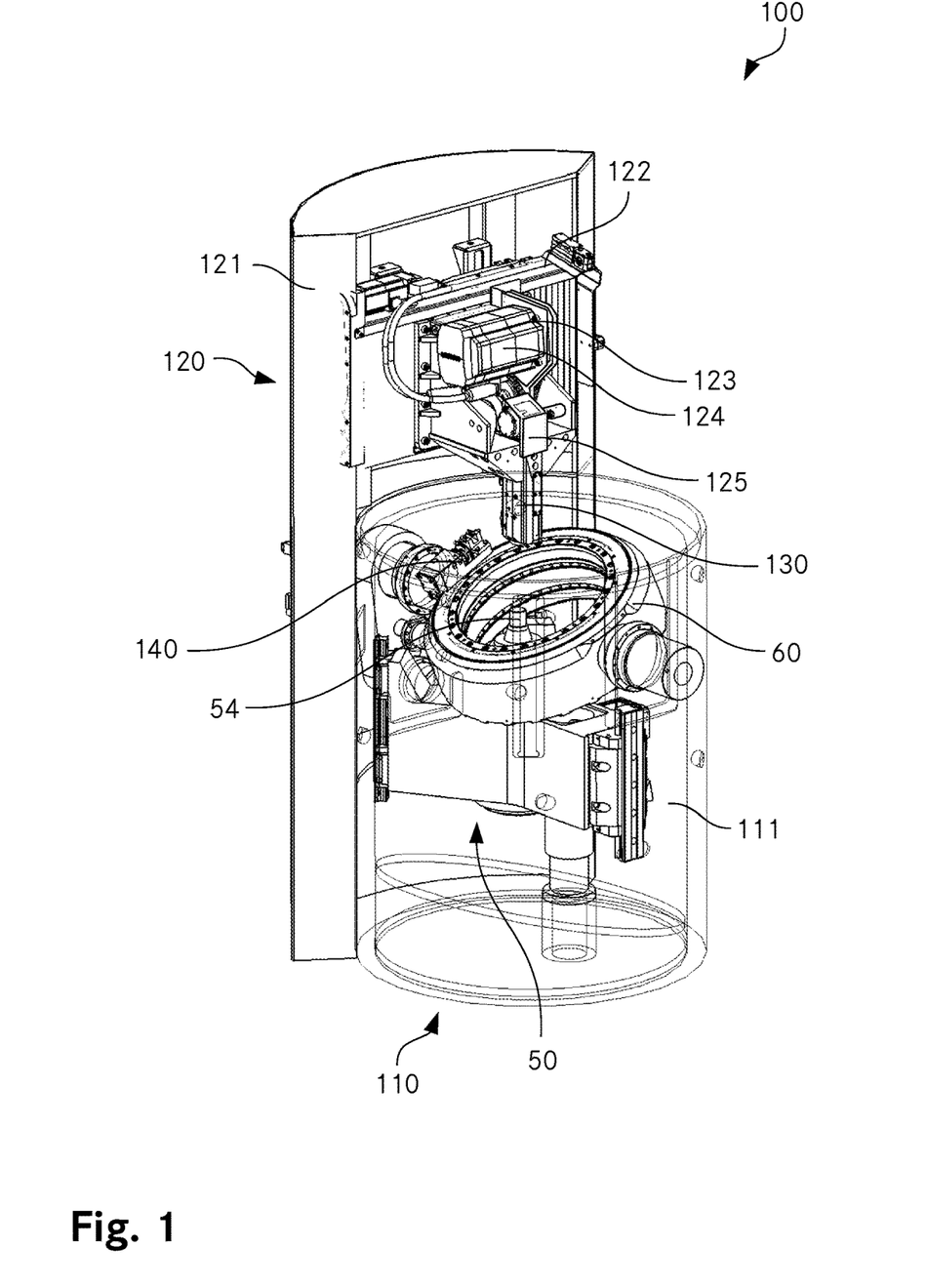
FIG. 1 shows an oblique view of a first embodiment of a machine for producing the honing ring and for honing using the honing ring produced.

An exemplary embodiment of the machine according to the invention for producing the honing ring and for honing using the honing ring produced is shown in FIGS. 1-6. FIG. 1 shows an oblique view of the machine.

Figure 2:
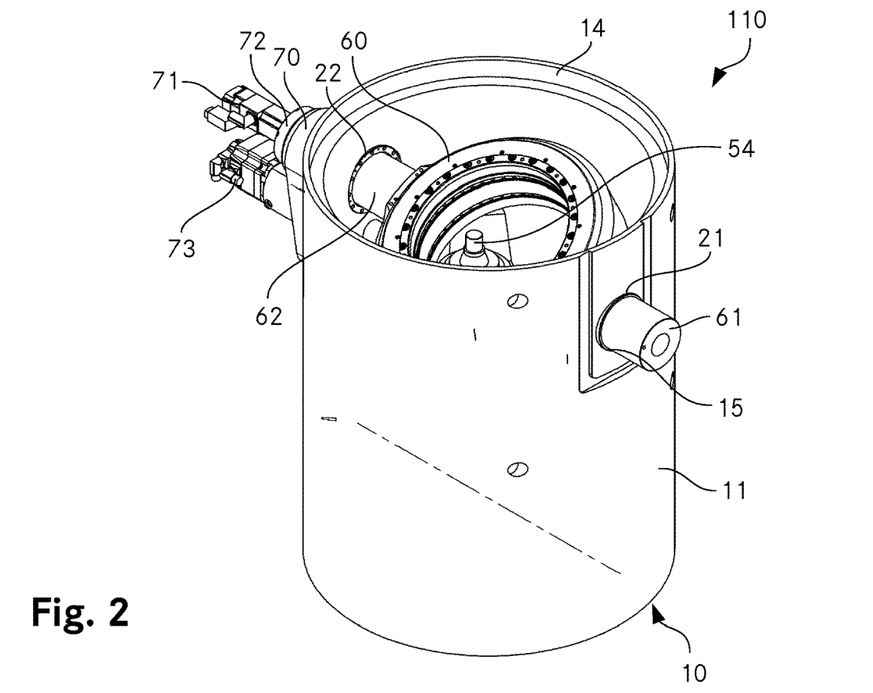
FIG. 2 shows an oblique view of the bottom part of the machine.
Figure 3:
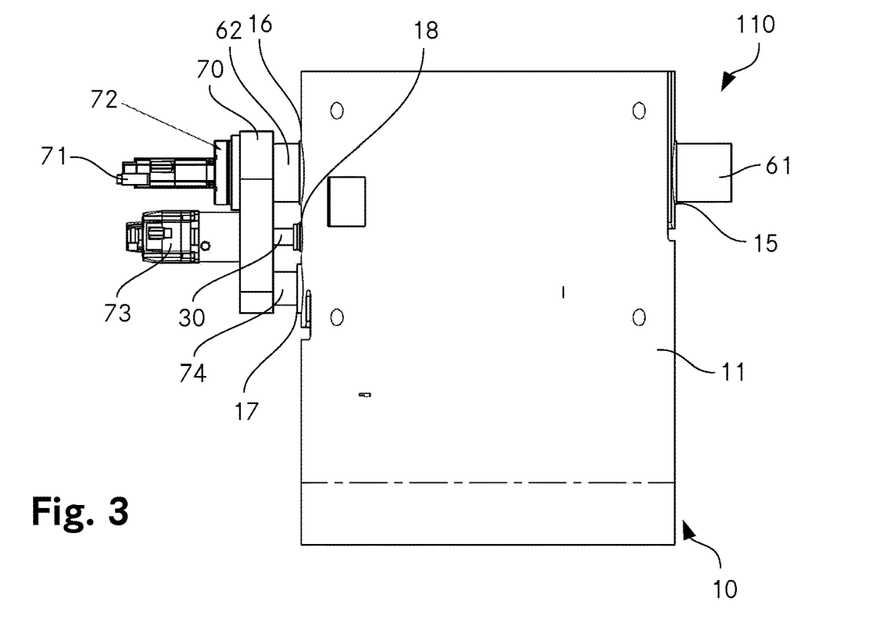
FIG. 3 shows a side view of the bottom part.
Figure 4:
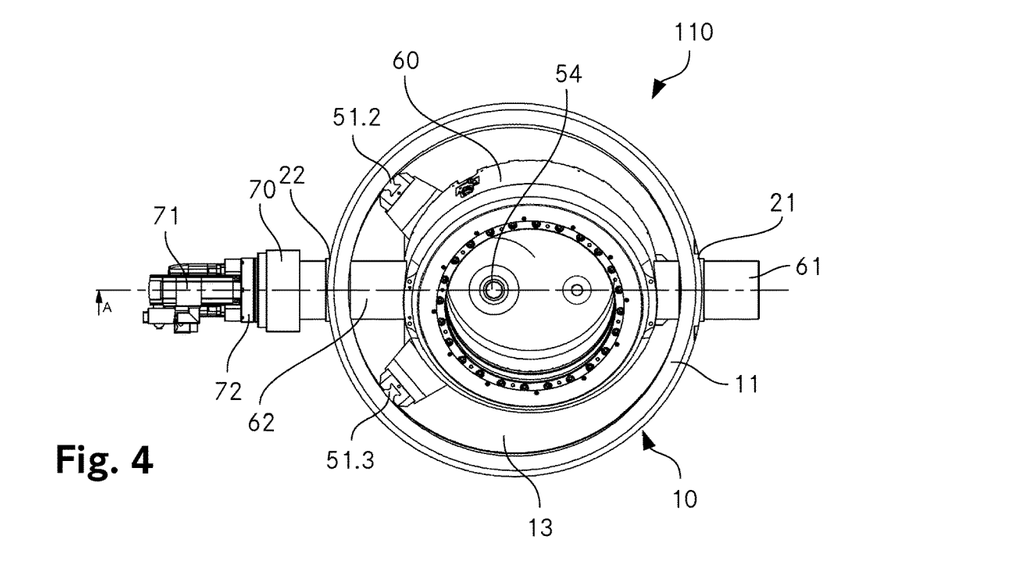
FIG. 4 shows a top view of the bottom part.

The machine 100 includes a bottom part 110 and a top part 120. The bottom part 110 of the machine is shown in FIGS. 2-6: FIG. 2 shows an oblique view, FIG. 3 a side view, FIG. 4 a top view, FIG. 5 a vertical cross section and FIGS. 6A, 6B two oblique views from various viewing angles, with the machine frame shown in a transparent manner.

The bottom part 110 includes a machine frame 10 and the casing thereof 11 is formed by a circular cylindrical steel tube. The circular bottom 12 is formed by a correspondingly formed steel plate which is fastened horizontally in the tube. A further thinner steel plate 13 is fastened in the casing 11 above the bottom 12. Said thinner steel plate 13 is oriented obliquely with respect to the bottom 12 and correspondingly has an elliptical form such that it fills out the casing 11 of the machine frame 10. The thinner steel plate 13 receives lubricants and chips, whereupon on account of the gravitational force these are moved downward along the steel plate 13 and can be caught at the bottom end of the plate and, where applicable, removed.

At the top end, the casing 11 of the machine frame 10 comprises a circumferential receiving groove 14 which is formed by an inside recess which opens out into the end face. A flat circular cylindrical cover can be inserted from above into said receiving groove 14 for the pure honing mode with the workpiece spindle arranged below in order to close off the receiving chamber formed by the machine frame 10. The cover can be produced from a transparent material such that visual inspection of the machining operation remains possible.

Four round openings 15, 16, 17, 18 are realized in the machine frame 10, the axes of which each extend horizontally and perpendicularly to the lateral surface of the casing 11. The two openings 15, 16 are located diametrically opposite one another and the axes thereof coincide. They each comprise a step of approximately half the casing thickness, the cross section of the openings 15, 16 widening from out to in at the step. Plain bushings 21, 22 are inserted into the openings 15, 16. The outside contours of the plain bushings 21, 22 are adapted to the inside contours of the openings 15, 16 with the steps. The plain bushings 21, 22 and the function thereof are described in more detail below.

The opening 17 is arranged vertically below the opening 16. It also comprises a step of approximately half the casing thickness, the cross section, however, in this case, reducing from out to in. A plain bushing 23 is also inserted into the opening 17. The diameter of the opening 17 and of the plain bushing 23 is smaller than that of the openings 15, 16.

The last opening 18 is situated on the connecting line between the centers of the openings 16, 17 arranged one below the other. Its diameter is somewhat smaller than that of the bottom opening 17. The nut 31 of a ball screw 30 is inserted into the middle opening 18.

A workpiece spindle device 50 is mounted in the machine frame 10. Said workpiece spindle device includes three vertically extending guide rails 51.1, 51.2, 51.3 which are fastened on the inside of the casing 11 of the machine frame 10. The first guide rail 51.1 is arranged directly below the single round opening 15, the two further guide rails 51.2, 51.3 are arranged symmetrically with respect to the three further openings 16, 17, 18 with reference to their angular position, the angle to the axis of the openings 15, 16, 17, 18 is approximately 40° each. One carriage each 52.1, 52.2, 52.3 interacts with each of the rails 51.1 . . . 3, each of the carriages 51.1 . . . 3 comprising two roller units each which interact in a manner known per se with the external profiling of the rails 51.1 . . . 3.

The carriages 51.1 . . . 3 are fixedly mounted on a spindle carrier 53. Said spindle carrier is substantially Y-shaped in top view, the three legs extending to the respective carriage 51.1 . . . 3.

Figure 5:
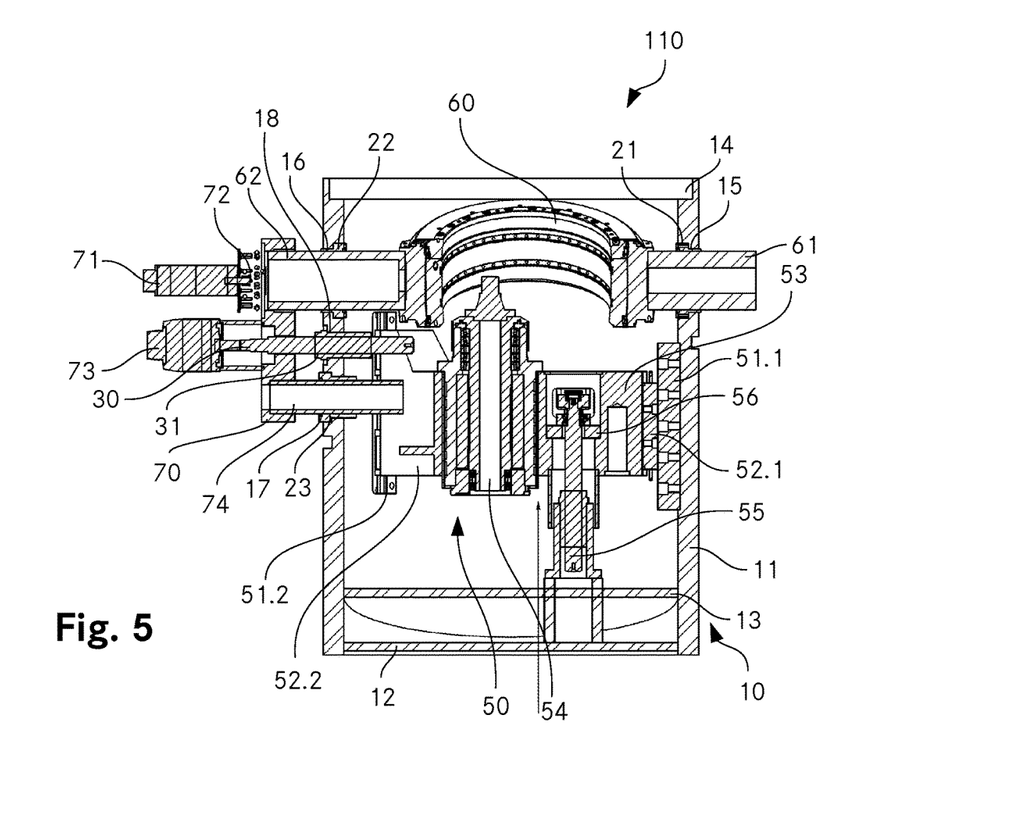
FIG. 5 shows a vertical section through the bottom part.
Figure 6A:
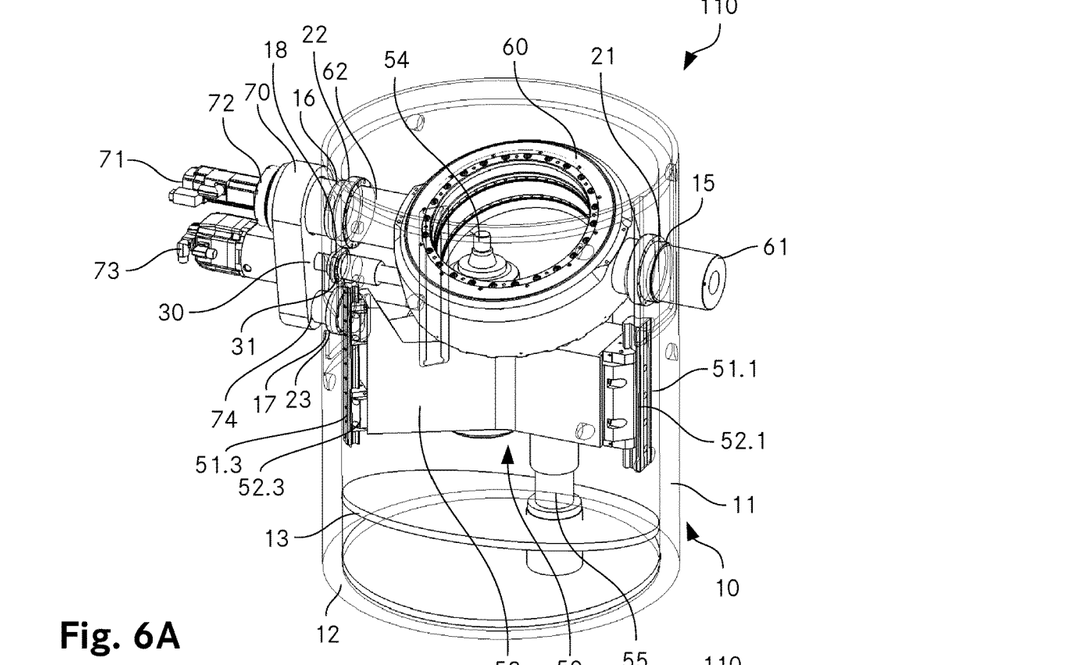
FIG. 6A, B show oblique views of the bottom part from various viewing angles, with the machine frame shown in a transparent manner.
Figure 6B:
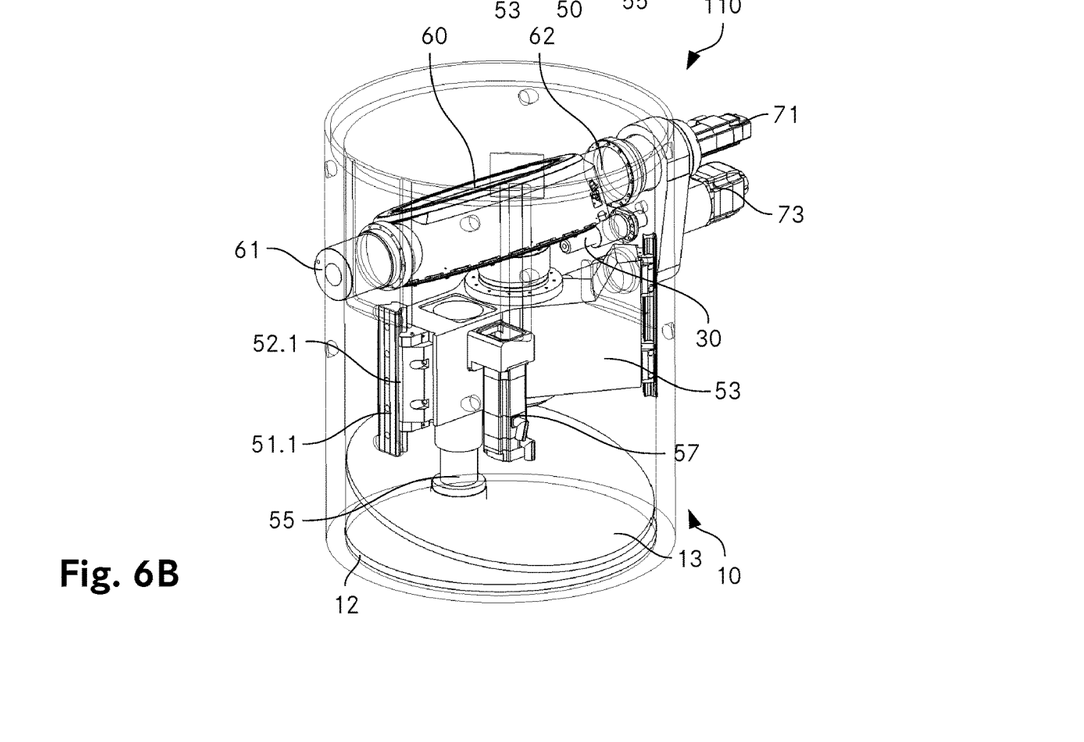

The workpiece spindle 54 is mounted in a central opening of the spindle carrier 53. In this case this is a spindle that is known per se and has direct drive. The free end of the workpiece spindle 54 includes coupling means for the direct or indirect fastening of the workpiece.

The nut 56 of a ball screw 55 is also mounted in the spindle carrier 53. The ball screw extends vertically downward from the spindle carrier 53 and extends through an opening in the obliquely oriented steel plate 13, its bottom end is supported on the bottom 12 of the machine frame 10. The drive of the ball screw 55 is effected by means of a toothed belt by a motor 57 which is flange-mounted on the outside of the spindle carrier 53 and moves up and down in the vertical direction with said spindle carrier.

The workpiece spindle 54 can be moved in the vertical direction in relation to the guide rails 51.1 . . . 3 by means of a linear movement of the carriages 52.1 . . . 3 such that the free end of the workpiece spindle 54 with the coupling means is able to reach every plane required inside the honing ring receiving means (see below). During the honing operation, the workpiece spindle 54 carries out in a dynamic manner a pendulum stroke with an amplitude of, for example, approximately 2 mm. In addition, its working height can be adjusted within a range of approximately 60 mm (statically). Both movements are brought about by the motor 57 by means of the ball screw 55.

As can be seen further below, the presence of the workpiece spindle device 50 is not absolutely necessary, it can also be omitted within the framework of the machine 100 for producing the honing ring and for honing, the workpiece in this case being mounted on the workpiece spindle module described further below.

The support device for a honing ring carrier 60 is mounted in the plain bushings 21, 22, 23 which are received in the openings 15, 16, 17 of the machine frame 10. The honing ring carrier is realized in the shape of a torus in a manner known per se, it includes a receiving means for a honing ring which can be set into a rotational movement about the torus axis by means of a direct drive. The support device includes two steel tubes 61, 62 which are fastened located diametrically opposite one another on the outside casing of the honing ring carrier 60. The steel tubes 61, 62 extend outward from the honing ring carrier 60 on both sides through the corresponding openings 15, 16 in the machine frame 10. Their outside dimensions are chosen such that they can interact in a precise-fitting manner with the corresponding plain bushings 21, 22. Whereas the steel tube 61, which interacts with the single opening 15, is free on its outside end, the outside end of the diametrically opposite steel tube 62 is mounted on a drive carrier 70. The bearing arrangement is realized such that the steel tube 62 can be rotated about its longitudinal axis in relation to the drive carrier 70 and that, however, the steel tube 62 is fixed in the axial direction in relation to the drive carrier 70.

The driven axis of a servomotor 71, which is fastened on the radially outer side of the drive carrier 70 and is supported in relation to said drive carrier, is in alignment with the longitudinal axis of the steel tube 62. The driven axis acts on the steel tube 62 by means of a robot drive 72 and consequently is able to rotate said steel tube relative to the drive carrier 70. In a corresponding manner, the angular position of the honing ring carrier 60 about the common longitudinal axes of the two steel tubes 61, 62 is changed.

A further servomotor 73 is also fastened on the outer side of the drive carrier 70 and supported in relation to the same. The further servomotor 73 interacts by means of a coupling with the ball screw 30 which, in turn, interacts with the above-mentioned nut 31 which is inserted into the middle opening 18. As a result of actuating the servomotor 73, the drive carrier 70 can be displaced radially inward or outward in the horizontal direction in relation to the machine frame 10. The position of the honing ring carrier 60 changes in a corresponding manner.

Finally, a further steel tube 74 is fixedly fastened on the drive carrier 70. It extends horizontally and radially inward through the bottom opening 17 into the interior of the machine frame 10.

Said steel tube 74 serves for anti-rotation protection and support, in particular for the torque exerted onto the steel tube 62 by means of the servomotor 71.

The top part 120 of the machine 100 is realized in a tower-like manner. It is fastened at the side of the machine frame 11 in the region of the drives for the pivoting and linear movement of the honing ring carrier 60. It comprises a housing 121 which receives a sector of the machine frame 11 of the bottom part 110 and extends upward beyond the bottom part 110.

Rails, on which a vehicle 122 is mounted so as to be vertically movable, are arranged in the top portion of the housing 121 of the top part 120. A carriage 123, which carries the coupling for the machining module, is mounted on the vehicle 122 so as to be movable in the horizontal direction. The carriage 123 supports a spindle drive 124 and a coupling 125 with a rapid clamping system, to which machining modules can be coupled and by means of which a rotational movement provided by the spindle drive 124 can be transmitted to the machining modules. In the representation according to FIG. 1, a sword-like grinding module 130 is coupled to the carriage 123. It can be freely positioned in a vertical plane by means of the vehicle and the carriage.

The grinding module 130 supports a dressable grinding wheel, e.g. a diamond grinding wheel or a CBN grinding wheel, on the bottom end. The rotational axis thereof is horizontally oriented, parallel to the vertical plane in which the carriage is displaceable.

A dressing device 140 is arranged on the top surface of the honing ring carrier 60 on the side of the honing ring carrier 60 facing the housing 121. Said dressing device includes a drive and includes portions or disks that are set into rotation by the drive for the rough machining or finishing of the grinding wheel of the grinding module 130. For example, a radius plate or a coarse, diamond-covered radius wheel can be used for rough machining, a correspondingly finer diamond-covered radius wheel for finishing.

A workpiece spindle module can be coupled in place of the grinding module 130. Said workpiece spindle module includes a clamping device for clamping workpieces (in particular gear wheel blanks) which is rotatable about a vertical axis.

A combined method for producing the honing ring and for gear wheel honing can be operated with the machine shown in FIGS. 1-6. To this end, a honing stone blank is first of all clamped in the honing ring carrier 60. The grinding wheel of the grinding module 130 coupled to the top part 120 of the machine 100 is then dressed by means of the dressing device 140. To this end, on the one hand the honing ring carrier 60, which does support the dressing device 140, and on the other hand the vehicle 122 with the carriage 123 are moved such that the grinding wheel moves into engagement with the corresponding tool of the dressing device 140. As a result of the combined movement of the named components, the grinding wheel and the honing ring can be freely positioned relative to one another inside a truly three-dimensional space.

Once the desired profile of the grinding wheel has been obtained, the grinding module 130 is moved from the dressing device 140 into the opening of the honing stone blank, here too there is also interaction again between the movements of the vehicle 122 with the carriage 123 and of the honing ring carrier 60. The profiling of the honing ring carrier can then be effected. Within the framework of the profiling operation, the grinding wheel of the grinding module 130, where required, can always be re-profiled in the same manner, it always being possible to generate this same surface quality and geometry or different surface qualities or geometries within the framework of a profiling operation.

As soon as the desired profile of the honing ring has been obtained, the grinding module 130 is moved into an idle position. The workpiece to be machined, in particular a gear wheel blank, is fastened on the free end of the workpiece spindle 54. The workpiece is then able to be machined by means of the profiled honing ring.

In an alternative method variant, the grinding module 130 is replaced by a workpiece spindle module as soon as the desired profile of the honing ring has been obtained. The workpiece to be machined, in particular a gear wheel blank, is clamped on the workpiece spindle module. As a result of interaction between the spindle and the movable bearing arrangement thereof (vehicle 122 with carriage 123) and the equally movable and pivotable honing ring carrier 60 as well as the direct drive for the honing ring, the workpiece is now able to be honed, it being possible to use the same clamping setup for the profiling of the honing stone and the honing process. The pendulum stroke necessary for the gear wheel honing is made available by means of the vehicle 122 and the corresponding drive.

The realization according to FIG. 1 is distinguished by a particularly compact design with a high level of flexibility.

Figure 7:
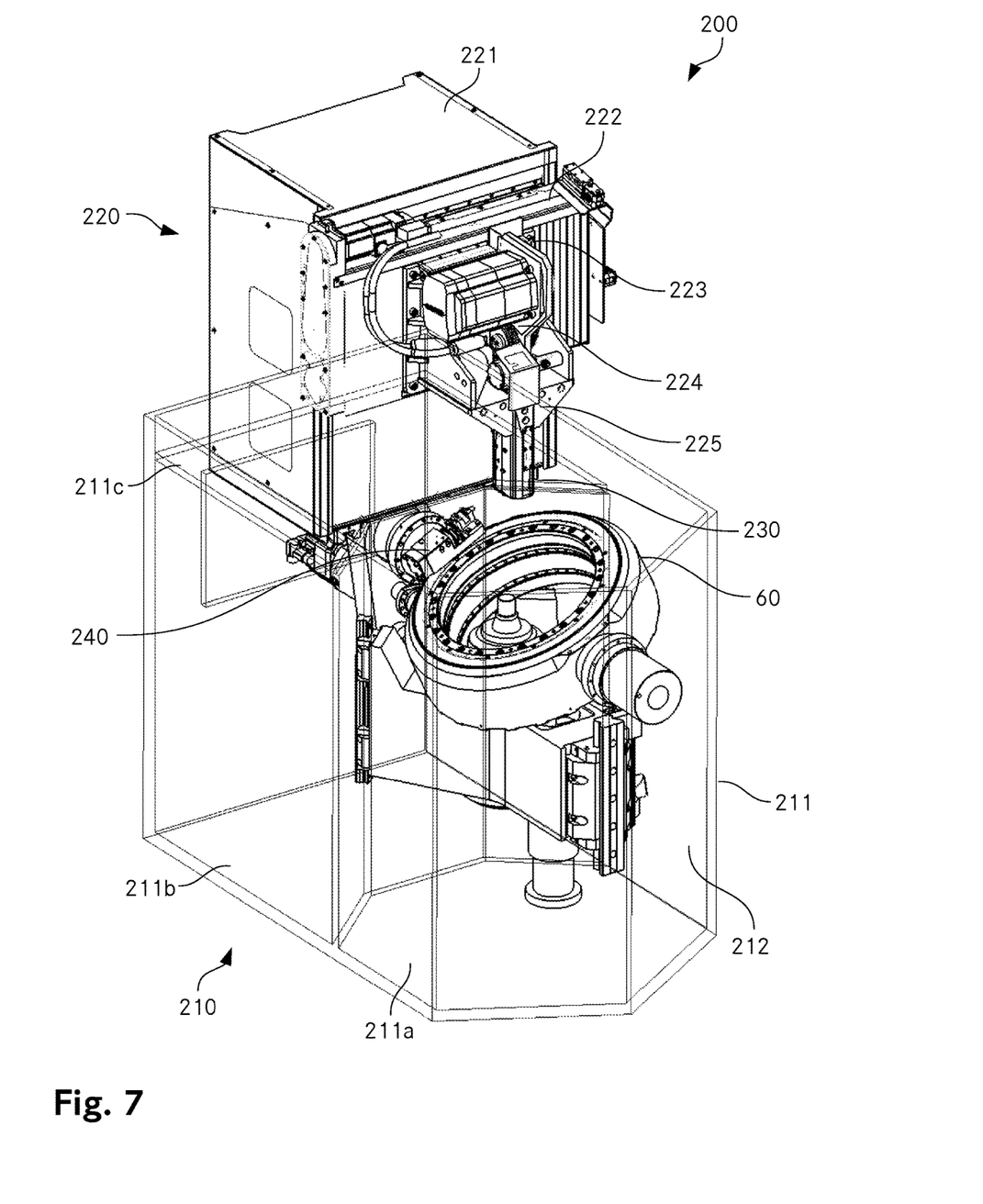
FIG. 7 shows an oblique view of a second embodiment of a machine for producing the honing ring and for honing using the honing ring produced.

FIG. 7 shows an oblique view of a second embodiment of a machine for producing the honing ring and for honing with the honing ring produced. The machine 200 corresponds in many respects to the machine 100 according to the first embodiment shown in conjunction with FIGS. 1-6. It includes a bottom part 210 and a top part 220. With the exception of the machine housing, the bottom part corresponds to the honing machine described in conjunction with FIGS. 1-6, consequently it is not described again.

The machine housing 211 of the bottom part 210 is realized in a straight cylindrical manner. Its area includes a hexagonal region 211*a*, a second region 211*b*, which supplements the shape of the area on said side to form a rectangle, connecting to said hexagonal region along three edges.

Lateral surfaces extend perpendicularly upward along both the borders of the hexagonal region 211*a* and of the second region 211*b*. On the one hand, a working area 212 is formed—in the hexagonal region 211*a*, on the other hand the second region 211*b* at the top end of the corresponding lateral surfaces is covered by a horizontal cover 211*c*.

The tower-like top part 220 includes a basic housing 221 which is supported on the cover 211*c*. A vehicle 222 is arranged so as to be movable in the vertical direction on a front side of the basic housing 221, which connects in a substantially flush manner to the lateral surface closing off the working area 212. A carriage 223 is mounted on said vehicle 222 in turn so as to be movable in the horizontal direction. The carriage 223 supports a spindle drive 224 and a coupling 225 with a rapid clamping system, to which machining modules can be coupled and by means of which a rotational movement provided by the spindle drive 224 is transmittable to the machining module. In the representation according to FIG. 7, a sword-like grinding module 230 is coupled to the carriage 223. It is able to positioned freely in a vertical plane by means of the vehicle and the carriage.

The grinding module 230 supports a dressable grinding wheel on the bottom end. The rotational axis thereof is horizontally oriented, parallel to the vertical plane in which the carriage is displaceable.

A dressing device 240 is arranged on the top surface of the honing ring carrier 60 on the side of the honing ring carrier 60 facing the basic housing 221. Said dressing device includes a drive and includes portions or disks that are set into rotation by the drive for the rough machining or finishing of the grinding wheel of the grinding module 230. For example, a radius plate or a coarse, diamond-covered radius wheel can be used for rough machining, a correspondingly finer diamond-covered radius wheel for finishing.

The combined method for producing the honing ring and for gear wheel honing described further above in conjunction with FIGS. 1-6 is also able to be realized with the machine shown in FIG. 7.

A workpiece spindle module can be coupled in place of the grinding module 230. Said workpiece spindle module includes a clamping device for clamping workpieces (in particular gear wheel blanks) which is rotatable about a vertical axis. The workpiece spindle shown in the representation according to FIG. 7 is not required in this case.

Figure 8:
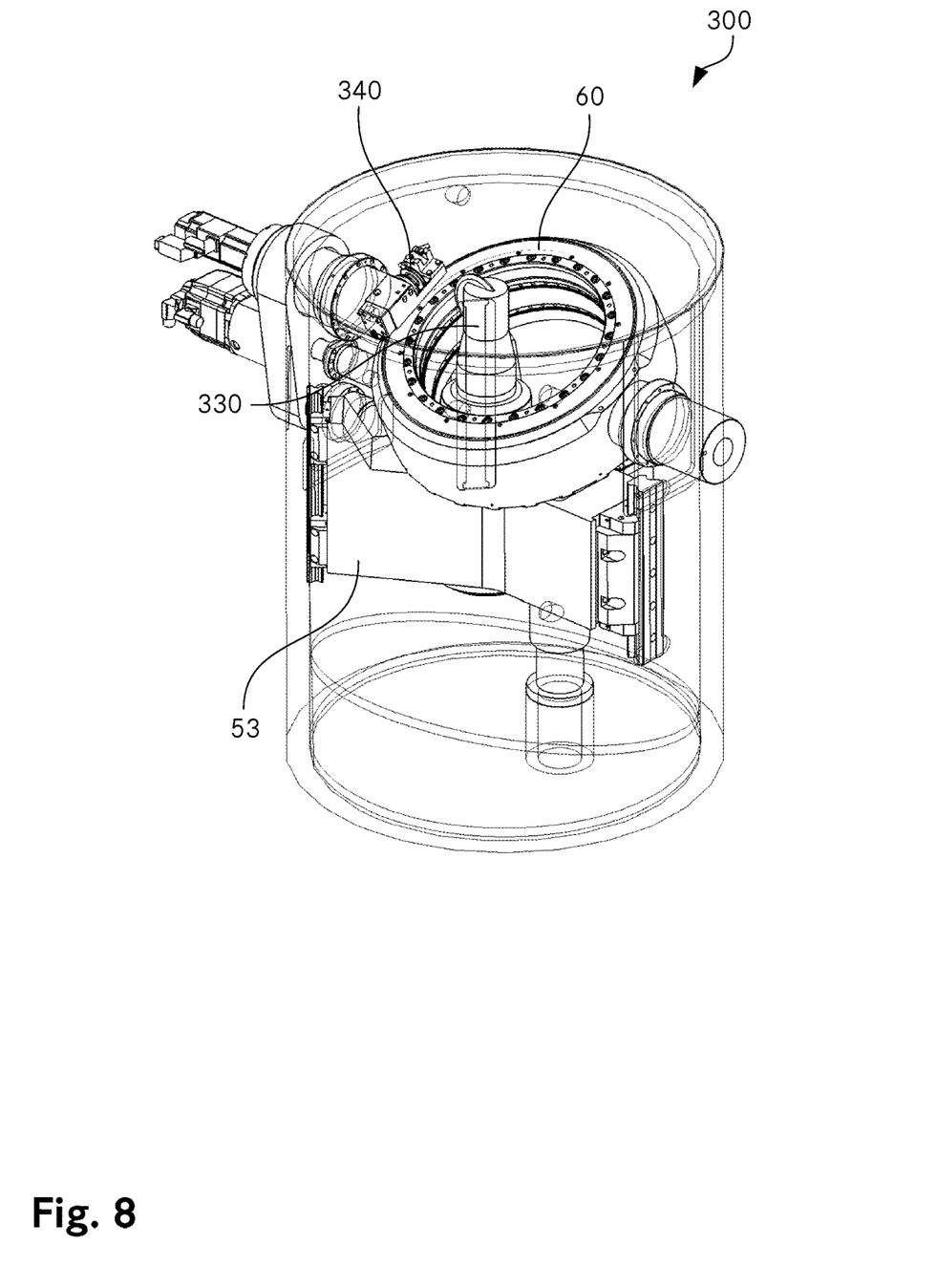
FIG. 8 shows an oblique view of a third embodiment of a machine for producing the honing ring and for honing using the honing ring produced.

FIG. 8 shows an oblique view of a third embodiment of a machine for producing the honing ring and for honing with the honing ring produced. The machine 300 corresponds in many respects to the machine 100 shown in FIGS. 1-6 with a bottom part with a workpiece spindle device. In contrast to said machine, however, all the components are arranged in the bottom part. The workpiece spindle 54 can be replaced by an angle-grinding unit 330. To this end, once again a coupling with a rapid clamping system is advantageously arranged on the spindle carrier 53, it being possible for both the workpiece spindle and the angle-grinding unit 330 to interact with said coupling.

For positioning the grinding wheel of the angle-grinding unit 330 during the profiling of the honing ring, the spindle carrier 53 comprises an additional linear horizontal axis which is not visible in FIG. 8 and by way of which the angle-grinding unit 330 can be moved transversely with respect to the longitudinal axis of the honing ring carrier 60. For profiling the grinding wheel of the angle-grinding unit 330, the dressing unit 340 can be moved up to the grinding wheel as a result of a corresponding linear movement of the honing ring carrier 60. The method of operation of the device corresponds substantially to that of the devices according to FIGS. 1-6 and 7.

The invention is not limited to the exemplary embodiments shown. Thus, in particular, the geometry of the individual components, e.g. of the machine frame, the drive carrier, the honing ring receiving means or the spindle carrier, can be chosen differently. The drives can be realized differently or arranged differently.

Instead of by means of rails fastened to the machine frame, the spindle carrier can also be vertically displaceable, for example, in relation to guides which are arranged on a support structure which is fastened on the machine frame and extends inward. The guides can be realized, for example, by guide tubes and plain bushings. The drive for the vertical movement of the spindle can also be arranged in a stationary manner on the carrier structure, i.e. in contrast to the exemplary embodiment shown above.

For honing internal toothing, the workpiece to be machined can also be clamped in the honing ring carrier and in turn the (externally profiled) honing tool on the workpiece spindle.

As already mentioned, the bottom spindle within the framework of the first two exemplary embodiments can be omitted, its receiving means is then taken over by the workpiece spindle module. In addition, the top part can include several couplings to which modules are couplable. The couplings can then be moved with the coupled modules into the operating position or into an idle position by suitable means (e.g. a turntable or a linear movement). Thus, it is, for example, conceivable for a turntable with a horizontal axis to be arranged on the carriage, two couplings being provided opposite one another on the turntable. If a grinding module is coupled to one of the couplings and a workpiece spindle module to the other of the couplings, the operating and idle positions of the two modules can be swapped as a result of a rotation by 180° about the horizontal axis. A fully automatic profiling and honing process is thus executable without external elements for changing the tool.

To increase the flexibility, the top part of the machine can be movable along a horizontal axis, which is perpendicular to the movement axes of the vehicle and of the carriage, along the cover of the machine frame of the bottom part, e.g. by being mounted on rails.

If a separate spindle is present and if said spindle and the grinding module can be set one above another in a horizontal direction, a honing tool for profiling internal toothing which is clamped in the bottom spindle can also be machined by means of the grinding module. The blank to be machined is then clamped into the honing ring carrier for profiling the internal toothing. The clamping setup of the honing tool can also remain in force here too.

For the sake of completeness, it must be mentioned that the described machines are also able to be operated in pure grinding or honing mode. In this case, internal and/or external profiling is created by means of the grinding module, or workpieces are honed by means of a honing tool (which does not have to be produced with the machine according to the invention) to generate an external or internal toothing. The scope of application of the machines is consequently very wide and the optimum process or the optimum combination of processes can be chosen in dependence on the workpiece to be machined.

In summary, it is to be noted that a machine for machining workpieces and a method for gear wheel honing are created as a result of the invention, both of which enable increased flexibility with reduced costs.

The invention claimed is:

1. A machine for machining workpieces, including
   a) a machine frame;
   b) a honing ring carrier which is mounted on the machine frame and in which a honing ring or a honing ring blank is clampable and rotationally drivable about its central axis;
   c) workpiece spindle module having a workpiece spindle; wherein a workpiece which is to be machined with the honing ring clamped in the honing ring carrier is mountable in the region of a free end of the workpiece spindle; and
   d) in addition to the workpiece spindle, a grinding module configured for use with a grinding wheel for generating a toothing in the honing ring blank as a result of grinding the honing ring blank, wherein the grinding wheel is not an externally toothed tool that is specific to the toothing to be generated in the honing ring blank, and wherein the grinding module is arranged in such a manner on the machine frame that a grinding wheel of the grinding module can be positioned relative to the honing ring carrier inside a truly three-dimensional space.

2. The machine as claimed in claim 1, wherein a dressing unit which is arranged on the machine frame for dressing the grinding wheel, wherein the grinding module is movable between a dressing position and a grinding position.

3. The machine as claimed in claim 2, wherein a rotational axis of the workpiece spindle and a rotational axis of the grinding wheel are oriented perpendicularly with respect to one another.

4. The machine as claimed in claim 1, further including a module carrier having at least one coupling for a machining module, wherein the module carrier is arranged in such a manner on the machine frame that the coupling can be positioned relative to the honing ring carrier inside a truly three-dimensional space, wherein the grinding module and the workpiece spindle module are couplable to the coupling of the module carrier.

5. The machine as claimed in claim 4, wherein the at least one coupling for the machining module is provided with a rapid clamping system.

6. The machine as claimed in claim 4, wherein the module carrier comprises several couplings for machining modules, wherein the couplings are movable from an idle position into an operating position.

7. The machine as claimed in claim 1, wherein the machine frame surrounds the honing ring carrier and the honing ring carrier is mounted at two bearing points of the machine frame which are located substantially diametrically opposite one another with reference to the honing ring carrier, so as to be movable linearly along a horizontal axis which extends through the bearing points and so as to be movable in rotation about said axis.

8. The machine as claimed in claim 7, wherein the machine frame forms a substantially closed casing which surrounds a working area.

9. The machine as claimed in claim 8, wherein a portion of the machine frame surrounding e working area is realized in a straight cylindrical manner.

10. The machine as claimed in claim 7, wherein a carrier on which a first drive is arranged for a linear movement of the honing ring carrier along the horizontal axis which extends through the bearing points and a second drive is arranged for a rotational movement of the honing ring carrier about said axis, wherein the carrier is arranged outside the machine frame and is displaceable together with the honing ring carrier along the horizontal axis.

11. A method for honing gear wheels which includes the following steps:
a) mount a honing ring blank in a honing ring carrier of a machine;
b) produce a honing ring as a result of grinding a toothing in the honing ring blank with a grinding wheel of a grinding module of the machine, wherein the grinding wheel is not an externally toothed tool which is specific to the honing ring to be produced;
c) put the grinding module into an idle position and position a workpiece spindle module of the machine in an operating position;
d) mount a gear wheel blank to be honed on a workpiece spindle of the workpiece spindle module; and
e) produce a gear wheel as a result of honing the gear wheel blank by means of the honing ring.

12. The method as claimed in claim 11, wherein prior to or during production of the honing ring, a grinding wheel of the grinding module is dressed with a dressing unit which is arranged on the machine.

13. The machine as claimed in claim 9, wherein the portion of the machine frame surrounding the working area is realized in a circular cylindrical manner.

* * * * *